United States Patent
Tamaki et al.

[11] Patent Number: 6,050,804
[45] Date of Patent: Apr. 18, 2000

[54] CLAMPING APPARATUS FOR INJECTION MOLDING MACHINE

[75] Inventors: Masahiro Tamaki; Jun Koike, both of Shizuoka-ken, Japan

[73] Assignee: Toshiba Kikai Kabushiki Kaisha, Tokyo-to, Japan

[21] Appl. No.: 09/149,103

[22] Filed: Sep. 8, 1998

[30] Foreign Application Priority Data

Sep. 8, 1997 [JP] Japan .................................. 9-243093

[51] Int. Cl.$^7$ .................................................. B29C 45/64
[52] U.S. Cl. ..................... 425/190; 100/258 A; 100/287; 425/451.6; 425/593
[58] Field of Search .................................. 425/190, 593, 425/451.6; 100/258 A, 287

[56] References Cited

U.S. PATENT DOCUMENTS

| | | | |
|---|---|---|---|
| 3,534,442 | 10/1970 | Mahle | 425/593 |
| 4,540,359 | 9/1985 | Yamazaki | 425/593 |
| 5,045,253 | 9/1991 | Kamiguchi et al. | 425/593 |
| 5,585,126 | 12/1996 | Heindl et al. | 425/593 |

FOREIGN PATENT DOCUMENTS 8-285  1/1996  Japan .

*Primary Examiner*—James P. Mackey
*Attorney, Agent, or Firm*—Pillsbury Madison & Sutro LLP

[57] ABSTRACT

A threaded shaft (52) for operating toggle joint (44) is driven for rotation by a first servomotor (46). A bevel gear (56) is mounted on the threaded shaft (52) for rotation relative to the threaded shaft (52). The bevel gear (56) is driven for rotation by a second servomotor (57). Bevel gears (60) each having a threaded bore are supported on a rear plate (42) are engaged with threaded sections (40A) of tie bars (40), respectively. Power is transmitted from the bevel gear (56) through power transmitting mechanisms (61) to the bevel gears (60). Each power transmitting mechanism (61) comprises bevel gears (62, 63) engaged with the bevel gears (56, 60), respectively, and a clutch (64) interposed between the bevel gears (62, 63). The clutches (64) are engaged and disengaged selectively to adjust the parallelism of a movable mold (36) with respect to a stationary mold (32).

5 Claims, 2 Drawing Sheets

CLAMPING APPARATUS FOR INJECTION MOLDING MACHINE

BACKGROUND OF THE INVENTION

1. Field of the Invention

The present invention relates to a clamping apparatus for an injection molding machine provided with a stationary platen, and a movable platen capable of moving along tie bars.

2. Description of the Related Art

Generally, a mold clamping apparatus for an injection molding machine has a stationary platen fixed to a frame, a plurality of tie bars each having one end fixedly held on the stationary platen, and a movable platen supported on the tie bars for movement along the same. A support member, which is called a rear plate or a link housing depending on its morphology, is disposed on the frame on the opposite side of the stationary platen to support the other ends of the tie bars, and to hold a driving mechanism for opening, closing and clamping a mold.

In a clamping apparatus provided with a toggle joint for pressing a movable mold against a stationary mold, the parallelism of the support member with respect to the stationary platen must accurately be adjusted when adjusting die height. Because errors made in assembling the clamping apparatus and the abrasion of pins connecting the links of the toggle joint lead directly to the deterioration of close contact between the stationary mold and the movable mold.

A parallelism adjusting mechanism for adjusting the parallelism of the support member with respect to the stationary platen is disclosed in JP B2 285/1996 issued to the assignee of the present invention. This prior art parallelism adjusting mechanism has a support member referred to as link housing and provided with adjusting gears each having a threaded bore and linked to the threaded end sections of the tie bars. The adjusting gears are driven by a single motor mounted on the link housing. A plurality of spur gears are supported within the link housing to transmit the driving force of the motor to the adjusting gears. One of the gears of a gear train for transmitting the driving force to each adjusting gear can be engaged with and disengaged from the adjacent gears. This prior art parallelism adjusting mechanism is capable of adjusting die height in a high accuracy by the single motor.

This prior art parallelism adjusting mechanism, however, needs some improvements. For example, torque acting on the gear must be removed when disengaging the same from the adjacent gears, the gears must properly be positioned relative to each other when engaging the gear with the adjacent gears. Accordingly, he automatic adjustment of die height requires complicated control operations. Since he gearing are built in the link housing, the parallelism adjusting mechanism requires difficult maintenance work. It is difficult to form the parallelism adjusting mechanism in a compact construction because an appropriate stroke must be secured for a cylinder actuator for engaging the gear with and disengaging the same from the adjacent gears, and the motor for driving the gears and a cylinder actuator for driving the toggle mechanisms protrude from the link housing.

SUMMARY OF THE INVENTION

Accordingly, it is an object of the present invention to provide a compact mold clamping apparatus for an injection molding machine, having a compact support member serving as a rear plate.

With the foregoing object in view, the present invention provides a clamping apparatus for an injection molding machine which includes: a stationary platen for holding a stationary mold; a movable platen for holding a movable mold, disposed opposite to the stationary platen; a plurality of tie bars for supporting and guiding the movable platen, each of the tie bars having a first end part fixedly joined to the stationary platen and an opposite second end part with a threaded section; a rear plate supporting the tie bars by their second end parts, the rear plate being disposed such that the movable platen is positioned between the rear plate and the stationary platen; a toggle joint interconnecting the rear plate and the movable platen to drive the movable platen; a threaded shaft supported for rotation on the rear plate and having a threaded section; a first motor for driving the threaded shaft for rotation; a crosshead provided at a link among those forming the toggle joint, the crosshead having a threaded bore engaged with the threaded section of the threaded shaft, the crosshead being capable of moving axially on the threaded shaft to operate the toggle joint when the threaded shaft is rotated; a first bevel gear mounted on the threaded shaft for rotation relatively to the threaded shaft; a second motor for driving the first bevel gear for rotation on the threaded shaft; second bevel gears supported for rotation on the rear plate, each of the second bevel gears having a threaded bore and engaged respectively with the threaded sections of the tie bars; and a plurality of transmission mechanisms for transmitting the driving force of the first bevel gear to the second bevel gears, each of the transmission mechanisms having a third bevel gear engaged with the first bevel gear, a fourth bevel gear engaged with the second bevel gear, and a clutch interposed between the third and the fourth bevel gear.

The above and other features and advantages of the present invention will become apparent from the following description taken in connection with the accompanying drawings.

DESCRIPTION OF THE PREFERRED EMBODIMENT

Figure 1:
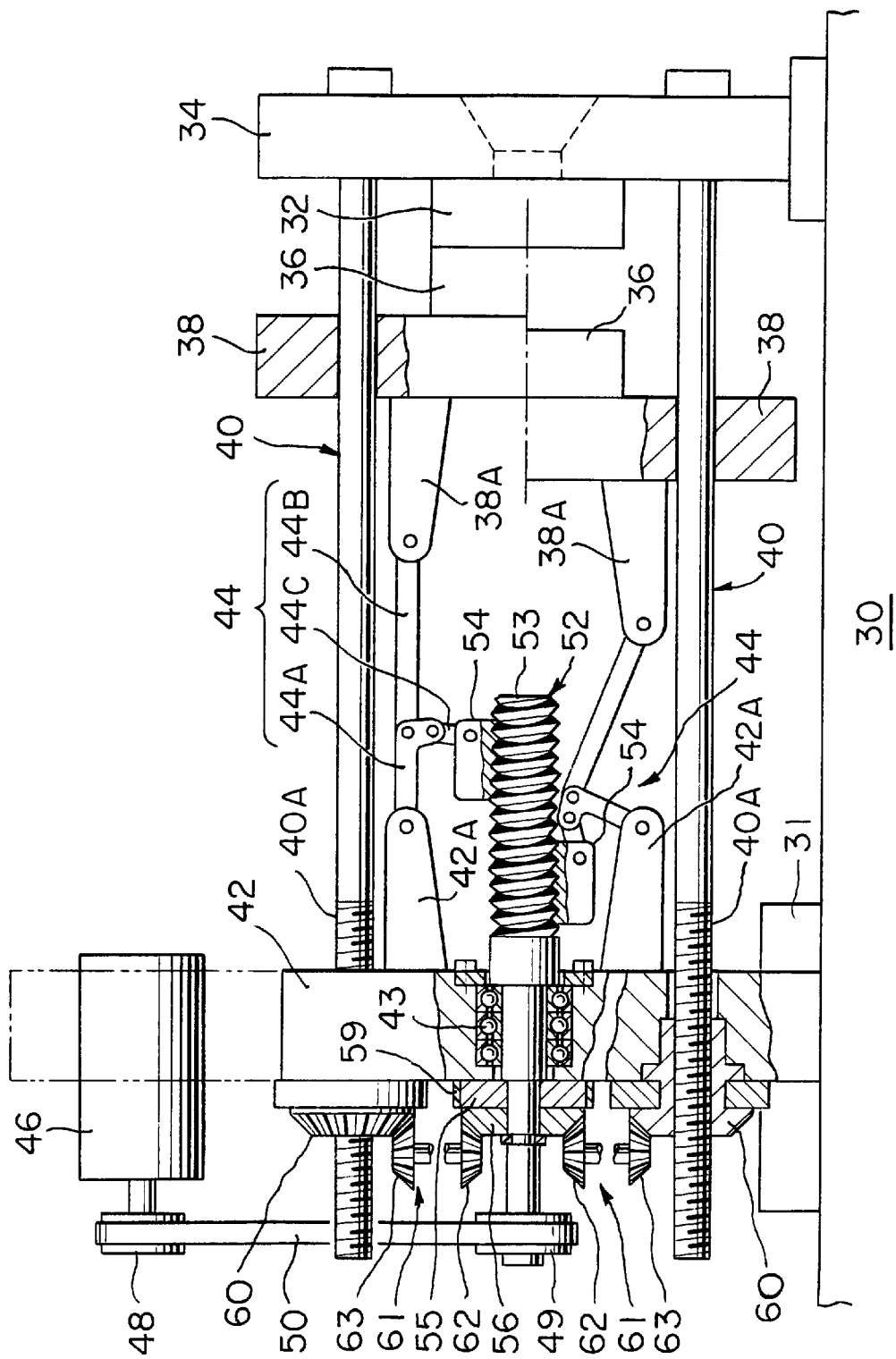
FIG. 1 is a partly sectional side view of a mold clamping mechanism in a preferred embodiment according to the present invention.
Figure 2:
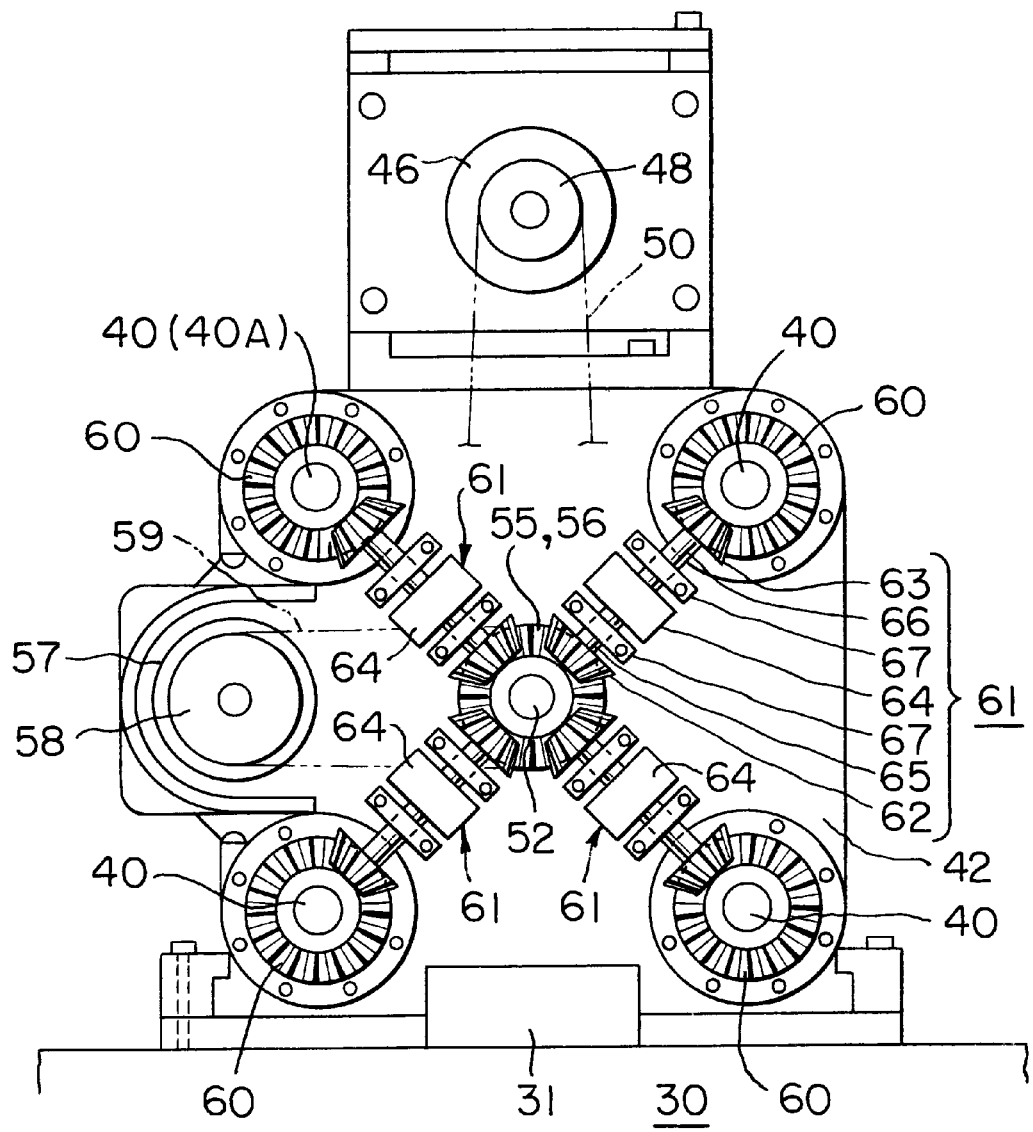
FIG. 2 is a back view of the mold clamping mechanism of FIG. 1, in which a pulley for driving a threaded shaft are omitted.

Referring to FIGS. 1 and 2, a stationary platen 34 for holding a stationary mold 32 is fixedly mounted on a frame 30 included in an injection molding machine, and a rear plate 42 is set on the frame 30 and can be moved in a forward direction, i.e., to the right as viewed in FIG. 1, and in a backward direction, i.e., to the left as viewed in FIG. 1, along a guide rail 31.

Four tie bars 40 are extended between the stationary platen 34 and the rear plate 42. Each tie bar 40 has a first end part fixed to the stationary platen 34, and a second end part having a threaded section 40A. A movable platen 38 for holding a movable mold 36 is disposed opposite to the stationary platen 34 at a position between the stationary platen 34 and the rear plate 42. The movable platen 38 is supported and guided for forward and backward movement on the tie bars 40.

The rear plate 42 is provided with a through hole in its central part. A threaded shaft 52 is supported for rotation in bearings 43 fitted in the through hole of the rear plate 42 and is restrained from axial movement. The threaded shaft 52 has a front part projecting toward the movable platen 38 from the rear plate 42 and having a threaded section 53.

A driven pulley 49 for synchronous drive is mounted on a rear end part of the threaded shaft 52. A first servomotor 46 for driving the threaded shaft 52 for rotation is mounted on top of the rear plate 42. A drive pulley 48 for synchronous drive is mounted on the output shaft of the servomotor 46, and a synchronous belt 50 is wound around the pulleys 48 and 49.

The rear plate 42 and the movable platen 38 are interconnected by a toggle joint 44. The toggle joint 44 is of a double link type and has links 44A, 44B and 44C. The links 44A and 44B are joined to a bracket 42A provided on the rear plate 42 and a bracket 38A provided on the movable platen 38, respectively. Each of the links 44C has one end joined to a crosshead 54, i.e., a nut having a threaded bore. The threaded shaft 52 is rotated to move the crosshead 54 axially along the threaded shaft 52. Thus, the toggle joint 44 is operated by driving the threaded shaft 52 for rotation by the servomotor 46 to close, to open and to clamp the mold.

The toggle joint 44 is not the essential components of the present invention and hence the toggle joint 44 shown in FIG. 1 is of a relatively simple construction, for simplicity of the drawing. It is obvious to those skilled in the art that the toggle joint 44 shown in FIG. 1 may be replaced with a toggle joint of any suitable type.

A driven pulley 55 for synchronous drive is mounted for rotation on the threaded shaft 52 and is restrained from axial movement. As shown in FIG. 2, a second servomotor 57 for driving the driven pulley 55 is mounted on one side of the rear plate 42. The servomotor 57 is disposed at a position in a region between the two tie bars 40 to form the mold clamping mechanism in a relatively small width. A drive pulley 58 for synchronous drive is mounted on the output shaft of the servomotor 57, and a synchronous belt 59 is wound around the pulleys 55 and 58.

A first bevel gear 56 is fixedly connected to the rear surface of the driven pulley 55. Through holes are formed in the four corners of the rear plate 42. Second bevel gears 60 having a threaded bore are rotatably fitted in the through holes of the rear plate 42 and are restrained from axial movement. The threaded section 40A of each tie bar 40 is in engagement with the threaded bore of the second bevel gear 60. The threaded sections 40A of the tie bars 40 extend through the rear plate 42 and the driven bevel gears 60 and project backward from the rear plate 42.

Four transmission mechanisms 61 are arranged on the back surface of the rear plate 42 to transmit power from the first bevel gear 56 to the second bevel gears 60. Each transmission mechanism 61 has an input end provided with a third bevel gear 62 engaged with the first bevel gear 56, an output end provided with a fourth bevel gear 63 engaged with the second bevel gear 60, and a clutch (preferably, electromagnetic clutch) 64 for the connection and disconnection of a shaft 65 holding the third bevel gear 62 and a shaft 66 holding the fourth bevel gear 63. The shafts 65 and 66 are supported in bearings held on bearing holders 67 attached to the rear plate 42.

Operations of the mold clamping mechanism will be described below.

(1) Mold Opening, Closing and Clamping Operations

The mold can be closed, opened and clamped by driving the toggle joint 44 by the servomotor 46.

(2) Die Height Adjustment

The stationary mold 32 and the movable mold 36 are attached to the stationary platen 34 and the movable platen 38, respectively. Subsequently, the servomotor 46 is actuated to set the toggle joint 44 in a state where the links 44A and 44B thereof are in a nearly straight-line position, the servomotor 46 is stopped, and then the threaded shaft 52 is locked.

Subsequently, the clutches 64 of the transmission mechanisms 61 are engaged, the servomotor 57 is actuated to move the rear plate 42 toward the stationary platen 34, and then the servomotor 46 is stopped after the movable mold 36 has been brought into contact with the stationary mold 32.

Suppose that the movable mold 36 is not perfectly parallel to the stationary mold 32 owing to, for example, errors made in assembling the clamping apparatus or the abrasion of the pins of the toggle joint 44. Then, one or some of the clutches 64 are engaged selectively and the servomotor 57 is actuated to adjust the position of the movable platen 38 relative to the stationary platen 34 so that the movable mold 36 is set perfectly in parallel to the stationary mold 32 is joined in perfect contact to the stationary mold 32.

The clutches 64 may be controlled by a controller, not shown, which engages and disengages the clutches 64 on the basis of tensile stresses induced respectively in the tie bars 40 and measured by sensors, not shown. If the clutches 64 are controlled by such a controller, the parallelism of the movable mold 36 with respect to the stationary mold 32 can automatically be adjusted by engaging all the clutches 64, actuating the servomotor 57, and disengaging the clutches upon the increase of the tensile stresses induced in the corresponding tie bars 40 to a reference value. It is also possible, during a molding process, to confirm that the movable mold 36 is in perfect contact with the stationary mold 32 by monitoring the tensile stresses induced in the tie bars 40 and, if the movable mold 36 is tilted relative to the stationary mold 32, the position of the movable mold 36 can be corrected.

What is claimed is:

1. A clamping apparatus for an injection molding machine, comprising:

a stationary platen for holding a stationary mold;

a movable platen for holding a movable mold, disposed opposite to the stationary platen;

a plurality of tie bars for supporting and guiding the movable platen, each of the tie bars having a first end part fixedly joined to the stationary platen and an opposite second end part with a threaded section;

a rear plate supporting the tie bars by their second end parts, the rear plate being disposed such that the movable platen is positioned between the rear plate and the stationary platen;

a toggle joint interconnecting the rear plate and the movable platen to drive the movable platen;

a threaded shaft supported for rotation on the rear plate and having a threaded section;

a first motor for driving the threaded shaft for rotation;

a crosshead provided at a link among those forming the toggle joint, the crosshead having a threaded bore engaged with the threaded section of the threaded shaft, the crosshead being capable of moving axially on the threaded shaft to operate the toggle joint when the threaded shaft is rotated;

a first bevel gear mounted on the threaded shaft for rotation relatively to the threaded shaft;

a second motor for driving the first bevel gear for rotation on the threaded shaft;

second bevel gears supported for rotation on the rear plate, each of the second bevel gears having a threaded bore and engaged respectively with the threaded sections of the tie bars; and a plurality of transmission mechanisms for transmitting the driving force of the first bevel gear to the second bevel gears, each of the transmission mechanisms having a third bevel gear engaged with the first bevel gear, a fourth bevel gear engaged with the second bevel gear, and a clutch interposed between the third and the fourth bevel gear.

2. The clamping apparatus according to claim 1, wherein the first and the second motor are mounted on the rear plate respectively at positions radially separated from the threaded shaft, and the first and the second motor drive the threaded shaft and the first bevel gear through endless power transmitting elements, respectively.

3. The mold clamping mechanism according to claim 2, wherein the endless power transmitting elements are synchronous belts.

4. The mold clamping mechanism according to claim 1, wherein the first motor is mounted on top of the rear plate, and the second motor is mounted on a side part of the rear plate.

5. The mold clamping mechanism according to claim 1, wherein the clutches are electromagnetic clutches.

* * * * *